United States Patent
Pfohe et al.

(10) Patent No.: US 7,610,564 B1
(45) Date of Patent: Oct. 27, 2009

(54) DISPLAYING AND BROWSING THROUGH A SPARSE VIEW OF CONTENT ITEMS IN A HIERARCHY

(75) Inventors: Thomas Pfohe, Hamburg (DE); Klaus Ruehl, Hamburg (DE); Jaime F. Guerrero, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 356 days.

(21) Appl. No.: 11/454,384

(22) Filed: Jun. 15, 2006

(51) Int. Cl.
*G06F 3/048* (2006.01)
*G06F 7/00* (2006.01)
(52) U.S. Cl. .............................. 715/854; 715/853; 707/3
(58) Field of Classification Search ................. 715/853, 715/854; 707/3
See application file for complete search history.

(56) References Cited

U.S. PATENT DOCUMENTS

| | | | | |
|---|---|---|---|---|
| 5,065,347 A | * | 11/1991 | Pajak et al. ................. | 715/835 |
| 6,028,602 A | * | 2/2000 | Weidenfeller et al. ....... | 715/781 |
| 6,484,190 B1 | * | 11/2002 | Cordes et al. ............... | 715/207 |
| 7,360,175 B2 | * | 4/2008 | Gardner et al. .............. | 715/854 |
| 2002/0030703 A1 | * | 3/2002 | Robertson et al. ........... | 345/853 |
| 2002/0059288 A1 | * | 5/2002 | Yagi et al. ................... | 707/102 |
| 2003/0098893 A1 | * | 5/2003 | Makinen ..................... | 345/853 |
| 2007/0168875 A1 | * | 7/2007 | Kowitz et al. ............... | 715/764 |
| 2007/0198949 A1 | * | 8/2007 | Rummel ..................... | 715/810 |

OTHER PUBLICATIONS

Microsoft Windows, version 5.1, copyright 2001, screenshots 1-7.*

* cited by examiner

*Primary Examiner*—Ting Zhou
(74) *Attorney, Agent, or Firm*—Park, Vaughan & Fleming LLP

(57) ABSTRACT

One embodiment of the present invention provides a system that displays and facilitates browsing through a sparse view of content items in a hierarchy. First, the system receives a request to display a set of content items with a common parent in a hierarchy. If the display area has insufficient space to display some of the items, the system logically splits the content items into a first subset of content items and a distinct second subset of content items. The system then displays the first subset, and displays a search element that represents the second subset. When the system detects the selection of the search element by a user, the system initiates a search operation that allows the user to determine and select a desired item from the second subset.

20 Claims, 7 Drawing Sheets

DISPLAYING AND BROWSING THROUGH A SPARSE VIEW OF CONTENT ITEMS IN A HIERARCHY

BACKGROUND

1. Field of the Invention

The present invention relates to techniques for displaying content on a computer display. More specifically, the present invention relates to a method and apparatus for displaying and browsing through a sparse view of content items in a hierarchy.

2. Related Art

When content, such as text or graphics, is displayed in a window, the content frequently requires more display space than is available in the window. Often, content items are organized hierarchically, to allow a user to more easily understand and browse through the content items to find a desired item.

One technique commonly used to visualize hierarchical structures is the "folder view," which, for example, is provided by Microsoft® Windows™ File Explorer. The folder view (also known as a "tree view") displays the hierarchy using a tree control, in which a node that is selected by a user expands to reveal the node's sub-nodes, if they exist. However, browsing a large amount of data using a tree control can be tedious. As the data set grows, the user has to browse through a growing vertical set of nodes. This involves rendering a larger amount of data, which can result in substantial performance degradation. For instance, in a web-based tree control, rendering the tree can involve retrieving the data from a remote location, rendering the tree to HTML at another location, and then sending the output to a client browser. Performing these operations can significantly decrease performance.

Hence, what is needed is a method and an apparatus for displaying and browsing through content items in a hierarchy, without the limitations of existing systems.

SUMMARY

One embodiment of the present invention provides a system that displays and facilitates browsing through a sparse view of content items in a hierarchy. First, the system receives a request to display a set of content items with a common parent in a hierarchy. If the display area has insufficient space to display some of the items, the system logically splits the content items into a first subset of content items and a distinct second subset of content items. The system then displays the first subset, and displays a search element that represents the second subset. When the system detects the selection of the search element by a user, the system initiates a search operation that allows the user to determine and select a desired item from the second subset.

In a variation on this embodiment, when the user selects an item from the second subset via the search operation, the system dynamically moves the item from the second subset to the first subset, and displays the item along with the other items in the first subset.

In a variation on this embodiment, the system displays the size of the second subset in the search element.

In a variation on this embodiment, the system receives a configuration parameter specifying a first limit on the number of content items which can be displayed. If the number of content items to be displayed is less than this first limit, the system displays all of the content items and no search element.

In a further variation, the system receives a configuration parameter specifying a second limit on the number of content items which can be displayed. If the number of content items is greater than the first limit, the size of the first subset of content items is restricted to the second limit. In this case, the system displays the first subset of content items and the search element.

In a further variation, the system initiates a search operation that opens a search window through which the user can perform a parameterized search that generates a set of results. When a user selects a result, the system selects a corresponding content item in the set of content items.

In a variation on this embodiment, the system tracks user selections to build a selection history. The system then partitions the content items between the first subset and the second subset based on this selection history.

In a variation on this embodiment, the system performs a query to determine the set of content items. The system then proceeds to form the first subset of content items based on preliminary results, and then displays this first subset along with the search element, before the query has completed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

The Folder View

Figure 1A:
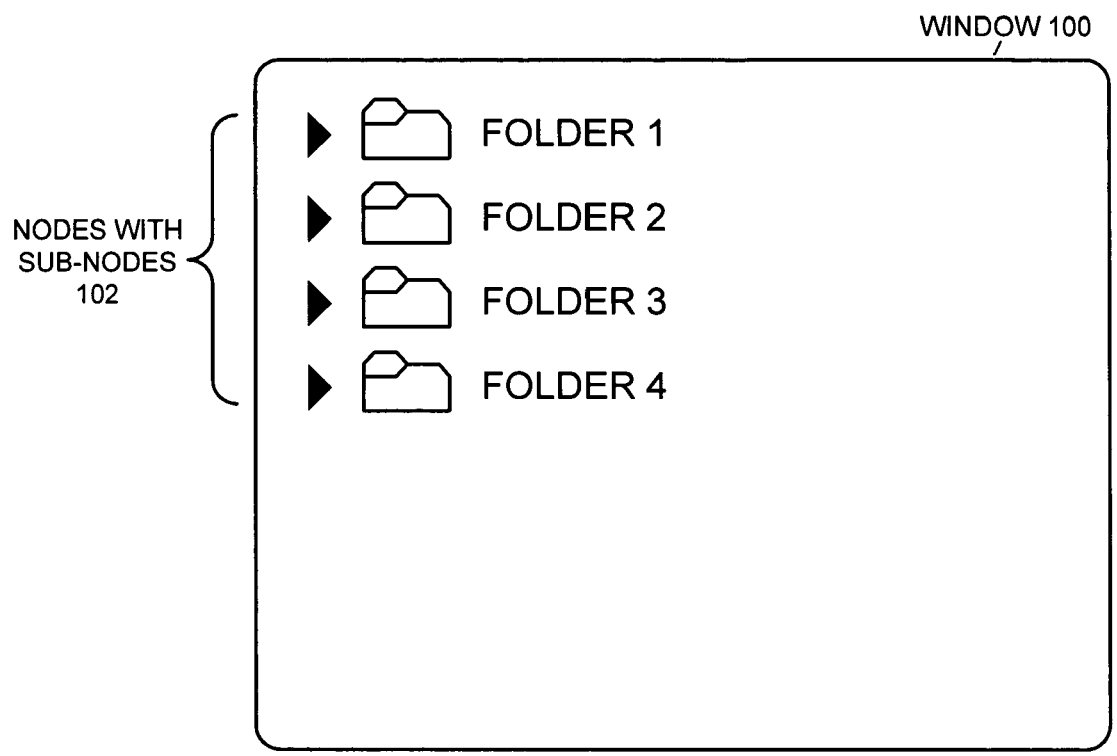
FIG. 1A illustrates a window displaying a set of unexpanded nodes in accordance with an embodiment of the present invention.
Figure 1B:
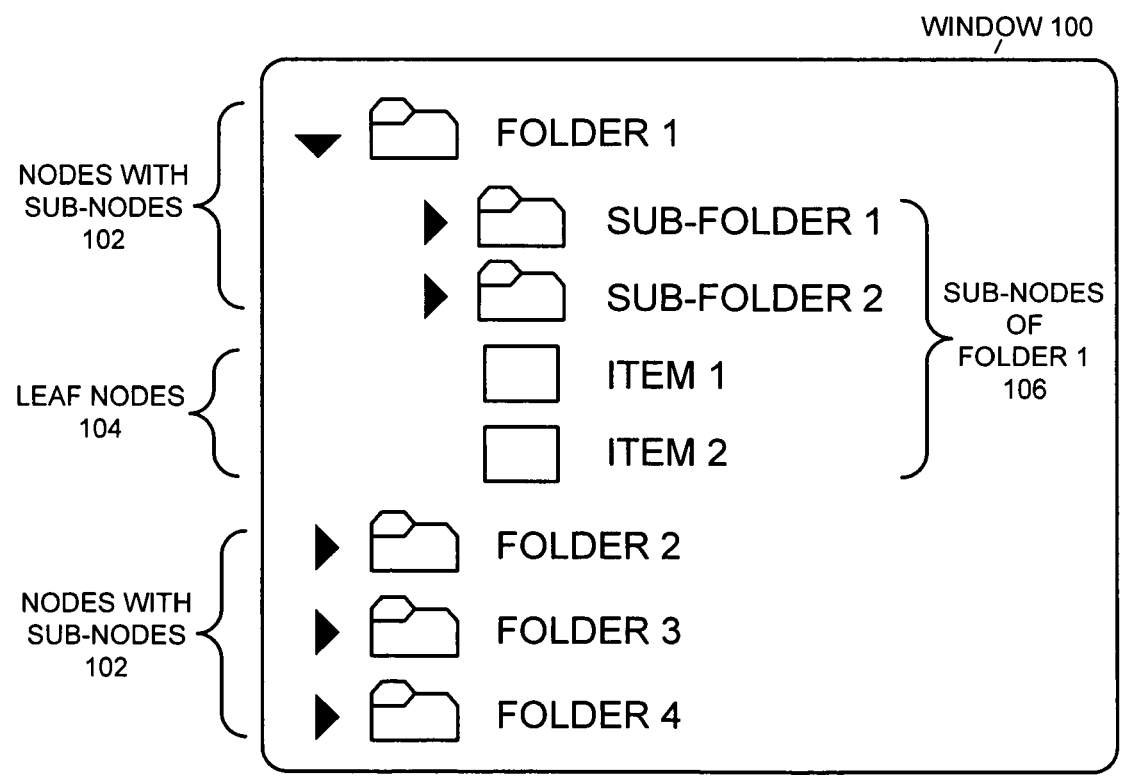
FIG. 1B illustrates a portion of a tree hierarchy after the expansion of a node with sub-nodes in accordance with an embodiment of the present invention.
Figure 1C:
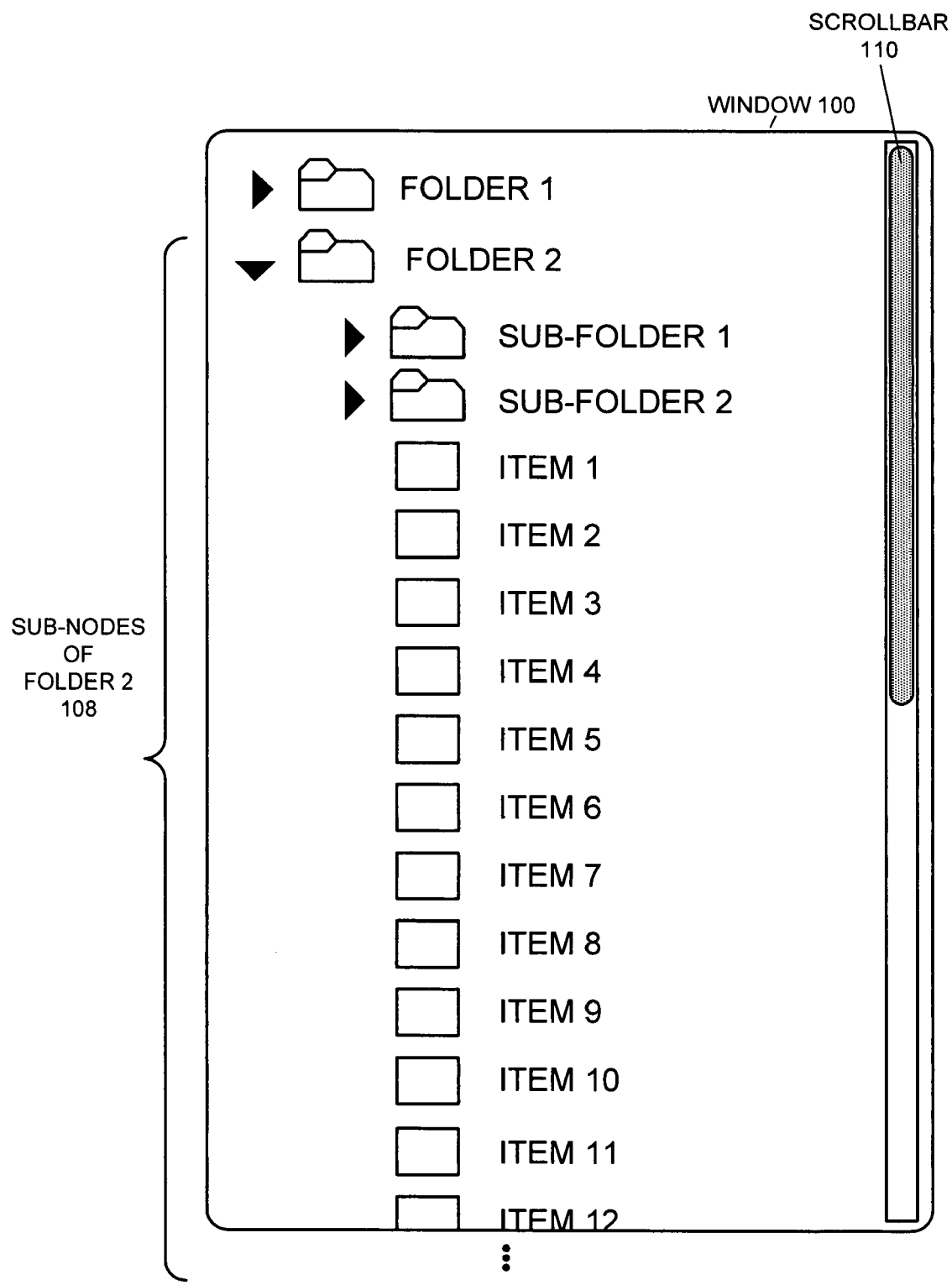
FIG. 1C illustrates the display of an expanded folder with a large number of sub-nodes in accordance with an embodiment of the present invention.

FIGS. 1A-1C illustrate a traditional folder view of a set of hierarchical nodes. FIG. 1A illustrates a window 100 displaying a set of unexpanded nodes with sub-nodes 102. In one embodiment of the present invention, nodes can include both expandable nodes such as folders containing sub-folders as well as un-expandable nodes, such as files.

FIG. 1B illustrates a portion of the tree hierarchy after the expansion of one of the nodes with sub-nodes 102 in response to user input. In FIG. 1B, folder one has been expanded into a set of sub-nodes 106 including two further sub-folders and two leaf-node items 104.

FIG. 1C illustrates the display of an expanded folder with a large number of sub-nodes. In a typical folder view, expanding a large set of items such as the sub-nodes of folder two 108 prompts the use of a scrollbar 110. Scrolling through multiple levels of the hierarchy to find a specific item may involve a substantial amount of scrolling and searching, which can be tedious.

Aside from increasing user browsing effort, displaying a large number of items can also involve substantial computation and lead to significant performance degradation. For instance, organizing and displaying a user interface which displays many items on a device with limited processing capabilities can be slow. Furthermore, in some scenarios, such as displaying query results in a web-based environment, delays in receiving data from a remote location may further delay the display process, especially if all results need to be present on the device before the display process can begin.

Hence, the typical folder view does not scale well. The present invention provides a system for displaying only a subset of items in response to the selection of a parent node in a hierarchy. By limiting the display to a subset, the system efficiently presents a scaleable sparse view that allows a user to find and select a desired content item quickly and easily and still provides a good visualization of the structure of the hierarchy.

Displaying and Browsing a Sparse View

Figure 2:
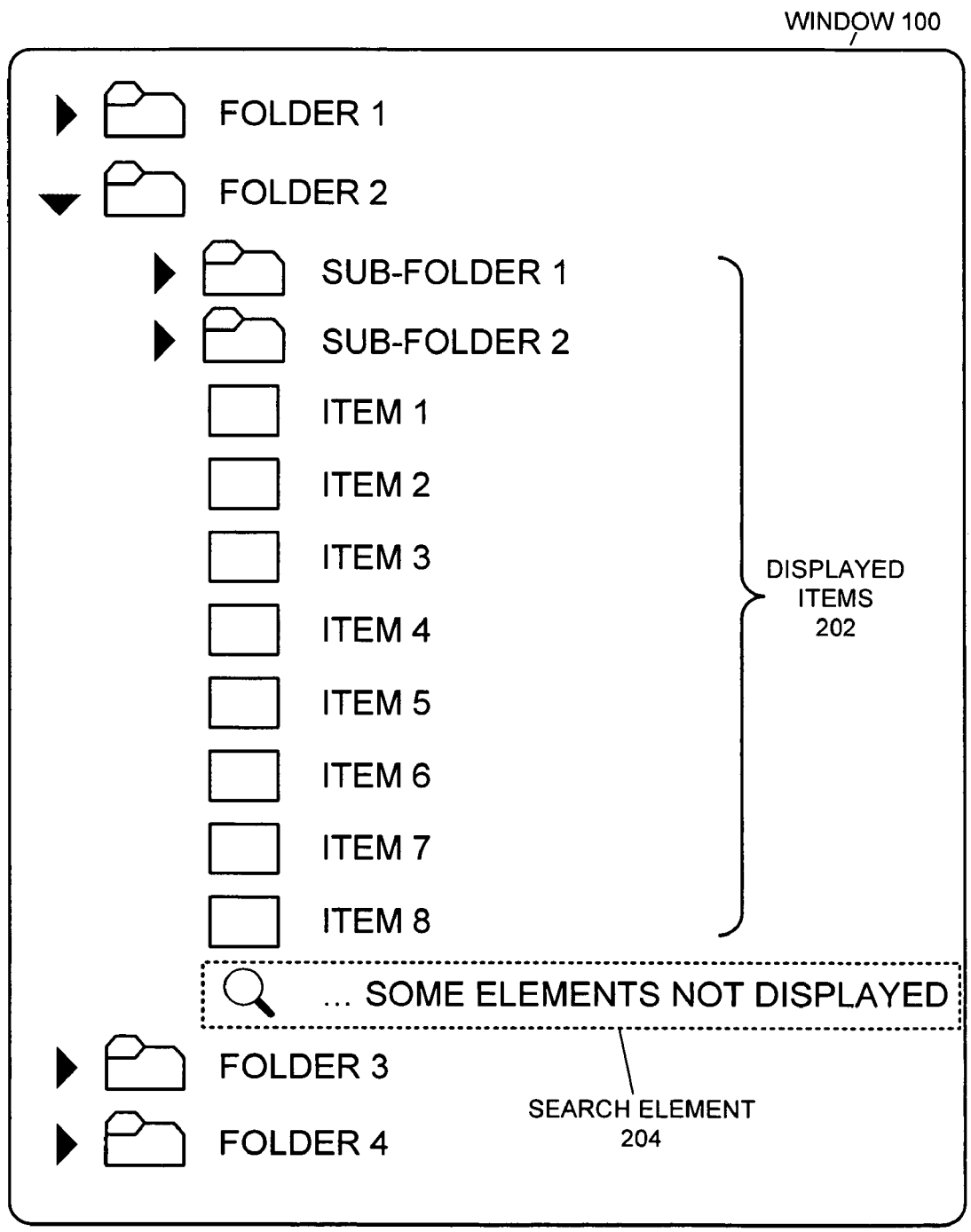
FIG. 2 illustrates the display of an expanded folder in which only a subset of items and a search element are displayed in accordance with an embodiment of the present invention.

In one embodiment of the present invention, when a user selects a node in a hierarchy, the system displays only a subset of the node's sub-nodes. FIG. 2 illustrates the display of the same expanded folder shown in FIG. 1C, in which, instead of displaying the full set of sub-nodes, the system displays a subset of the items 202 and a search element 204 that represents the remaining (un-displayed) items. If the user selects this search element 204, the system initiates a search operation that allows the user to easily determine and select a desired content item from the hierarchy. Displaying only the subset of items reduces display overhead and also allows the system to display results without having to wait for the full set of results to be received or computed.

In one embodiment of the present invention, the system uses two configurable limits to determine how to display a set of content items. The system uses a first limit to determine the minimum number of content items needed to prompt the use of a search element 204. If the number of items is less than the first limit, all of the items are displayed, and no search element is displayed. The system uses a second limit to determine how many items to display if the number of content items exceeds the first limit. For instance, if the first and second limit have the values twelve and eleven, respectively, the system might display twelve or less items directly with no search element. If more than twelve items are present, the system might display eleven items and the search element to represent the un-displayed items, for a total of twelve items displayed. By configuring these limits, a user can adapt the number of displayed sub-nodes to customize system behavior. For instance, the user could configure the limits with high values to present standard tree behavior, or very low values to essentially prompt a search every time a node is expanded.

In one embodiment of the present invention, the search element includes a count value indicating the number of un-displayed content items represented by the search element. Although displaying this count value provides valuable context to the user, the system or user may decide whether or not to display this count based on other factors, such as the application environment. For instance, computing a sum of the results may be as time-intensive as computing all of the results, and hence may involve considerable delay. In the case of a query over a network, the time needed to compute such a result may also depend on factors such as the delay and throughput of the various network connections involved and the computational capabilities and loads of the computers involved.

Figure 3:
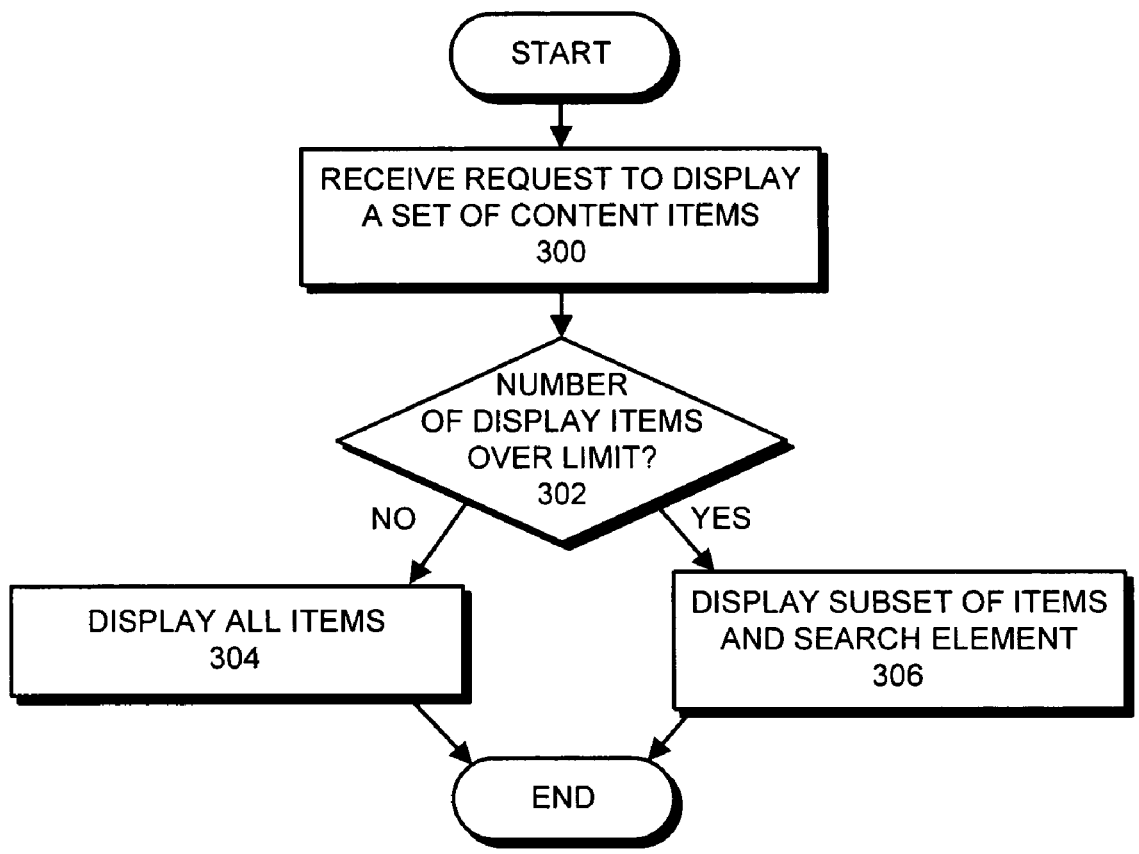
FIG. 3 presents a flow chart illustrating the process of displaying a sparse view in accordance with an embodiment of the present invention.

FIG. 3 presents a flow chart illustrating the process of displaying a sparse view. First, the system receives a request to display a set of content items (step 300). The system checks to see if the number of display items is above the first limit (step 302); if not, the system displays all of the items (step 304). Otherwise, the system displays a subset of the items along with a search element representing the remaining un-displayed items (step 306).

The system can employ a wide range of search techniques to assist the user in selecting a desired content item from the set of items represented by the search element. In one embodiment of the present invention, when the user selects the search element, the system opens a search window through which the user can perform a parameterized search. In a further embodiment, when the user selects a search result, the system moves the window containing the hierarchy being browsed back to the forefront, adds the result element to the set of displayed items, and automatically selects the item corresponding to the result element. Note that the search capability can include a simple, flat search of items sharing a common parent in the hierarchy, in which case a separate search window might be initiated for each level in the hierarchy browsed. Alternatively, the system may include a more powerful recursive search that simultaneously searches both the present hierarchical level as well as all sub-levels, perhaps returning not only a specific item but also an associated sub-path in the searched hierarchy.

Figure 4:
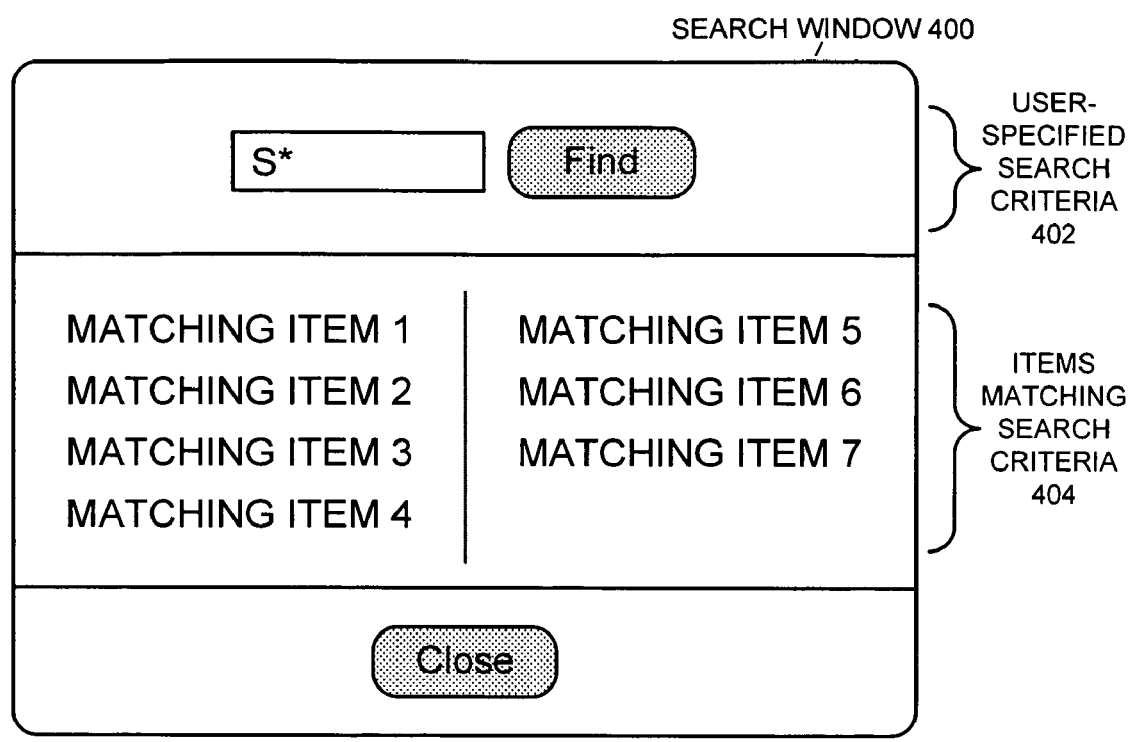
FIG. 4 illustrates a search window in accordance with an embodiment of the present invention.

FIG. 4 illustrates a search window 400. The system can open this search window 400 with the input focus on an area that expects user-specified search criteria 402. The system generates a set of results based on the user input, and then presents the set of items matching the search criteria 404, perhaps as a paginated table. This search example attempts to minimize the number of user actions needed to: 1) select the search element; 2) enter one or more search terms; and to 3) select a result.

Figure 5:
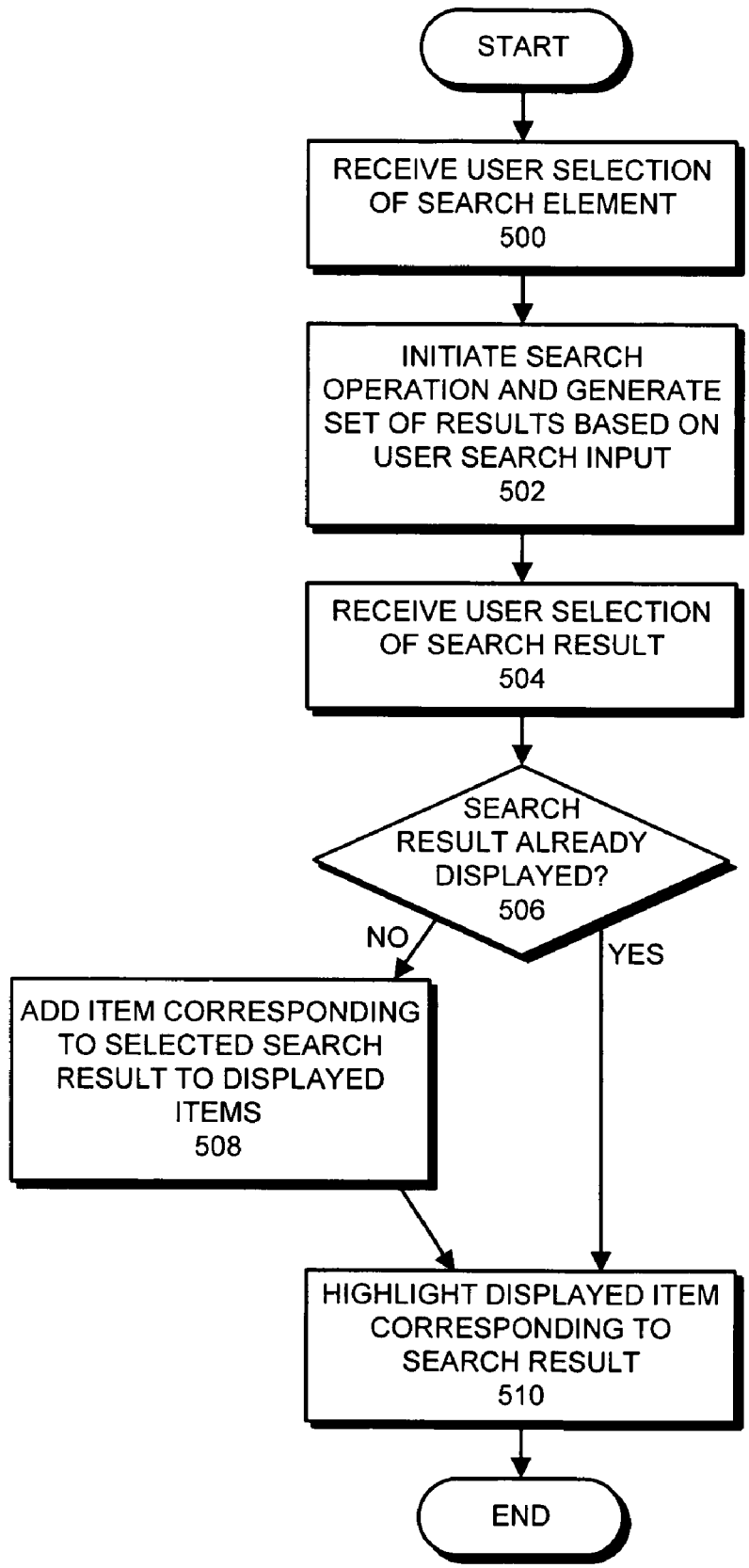
FIG. 5 presents a flow chart illustrating the process of handling a user selection of the search element in accordance with an embodiment of the present invention.

FIG. 5 presents a flow chart illustrating the process of handling a user selection of a search element. After receiving the user selection of a search element placeholder (step 500), the system initiates the search operation, for instance by opening a search window of the type shown in FIG. 4, and then generates a set of search results based on the user search input (step 502). After receiving the user selection of a search result (step 504), the system determines whether the item corresponding to the selected search result is already in the displayed subset (step 506), and updates the display accordingly. If the item is not yet displayed, the system adds the item to the displayed set (step 508). The system then highlights the selected item (step 510).

In one embodiment of the present invention, the system includes a set of rules that are used to determine the set of content items to be displayed and the set of content items to be represented by the search element. For instance, the system may include a tracking mechanism that tracks selection history, and is more likely to display frequently-accessed items. In another embodiment, the system may change the display to replace an infrequently-accessed item with a recently-accessed item.

Note that the present invention can be applied to any hierarchical system, including a tree-based navigation interface as well as other non-tree systems, such as drill-down-based interfaces and other non-search hierarchy navigation interfaces, such as those of popular e-commerce websites such as Amazon.com®, the old non-search Yahoo!® Directory, and the Microsoft® Windows™ "My Computer" interface, which in all cases show only the immediate members of one branch of their respective data hierarchies at a time.

In one embodiment of the present invention, the system provides substantially similar functionality and scalability for a set of non-hierarchical data. For instance, the system can also split non-hierarchical data, such as a large, flat list, into two subsets, displaying one of the subsets and a placeholder search element for the second subset. The system can then proceed to use an external search mechanism to assist in finding desired items, and add selected search results one at a time to the set of displayed items.

Computer System

Figure 6:
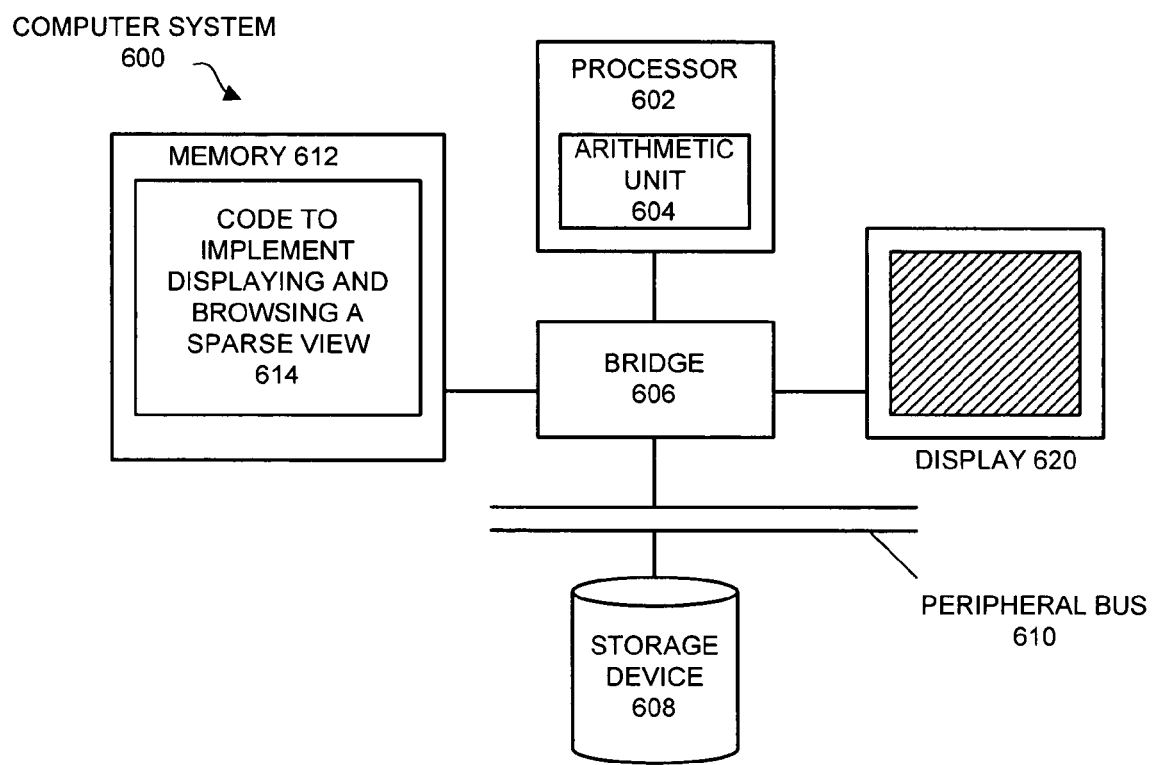
FIG. 6 illustrates a computer system in accordance with an embodiment of the present invention.

FIG. 6 illustrates a computer system 600 in accordance with an embodiment of the present invention. As illustrated in FIG. 6, the computer system 600 includes a processor 602, which is coupled to a memory 612, a display 620 and a peripheral bus 610 through a bridge 606. The bridge 606 can generally include any type of circuitry for coupling components of the computer system 600 together.

The processor 602 can include any type of processor, including, but not limited to, a microprocessor, a mainframe computer, a digital signal processor, a personal organizer, a device controller and a computational engine within an appliance. The processor 602 includes an arithmetic unit 604, which is capable of performing computational operations.

The processor 602 communicates with a storage device 608 through a bridge 606 and a peripheral bus 610. Storage device 608 can include any type of non-volatile storage device that can be coupled to a computer system. This includes, but is not limited to, magnetic, optical, and magneto-optical storage devices, as well as storage devices based on flash memory and/or battery-backed up memory.

The processor 602 communicates with the display 620 through a bridge 606. The display 620 can include any type of computer system display that can be used to present a user interface that implements folded scrolling.

The processor 602 communicates with the memory 612 through the bridge 606. The memory 612 can include any type of memory that can store code and data for execution by the processor 602. As illustrated in FIG. 6, the memory 612 contains code to implement displaying and browsing a sparse view 614.

Note that although the present invention is described in the context of the computer system 600 illustrated in FIG. 6, the present invention can generally operate on any type of computing device. Hence, the present invention is not limited to the computer system 600 illustrated in FIG. 6.

In summary, the present invention provides a scalable system for displaying and browsing a many-itemed branch of a hierarchy. This system displays only some items of a hierarchical branch, along with a search element displayed as a placeholder. This search element triggers a search mechanism that can yield additional items that can be dynamically added to the branch, thereby allowing potentially thousands or more of items to be browsed quickly and efficiently.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for displaying and browsing through a sparse view of content items in a hierarchy, comprising:
   receiving a request to display a set of content items with a common parent in the hierarchy, wherein a display area on a computer display has insufficient space to simultaneously display all of the content items from the set of content items, and wherein the set of content items includes a first subset of content items and a disjoint second subset of content items;
   displaying the first subset of content items;
   displaying as a content item in the hierarchy a search element that represents the second subset of content items, wherein displaying the search element indicates to a user the presence of the second subset of content items which are not currently displayed;
   upon receiving a selection of the search element by a user, initiating a search operation that allows the user to determine and select a desired content item from the second subset of content items;
   upon receiving a user-selected content item from the second subset of content items during the search operation, adjusting the first subset of content items to include the user-selected content item; and
   displaying the adjusted first subset of content items in the computer display.

2. The method of claim 1,
   wherein when a content item is selected from the second subset of content items, the content item is dynamically moved from the second subset to the first subset; and
   wherein dynamically moving the content item from the second subset to the first subset causes the display of the content item.

3. The method of claim 1, wherein displaying the search element involves displaying the size of the second subset of content items.

4. The method of claim 1, wherein receiving the request to display the set of content items further involves:
   receiving a first limit on the number of content items which can be displayed; and
   wherein if the number of content items is less than the first limit, all content items in the set of content items are displayed, and no search element is displayed.

5. The method of claim 4, where receiving the request to display the set of content items further involves:
   receiving a second limit on the number of content items which can be displayed; and
   wherein if the number of content items is greater than the first limit, the size of the first subset of content items is limited to the second limit, and the first subset of content items and the search element are displayed.

6. The method of claim 2,
   wherein the search operation involves opening a search window in which the user can perform a parameterized search that generates a set of results; and
   wherein selecting a result from the set of results causes the selection of a corresponding content item in the set of content items.

7. The method of claim 1, wherein the method further comprises:
   tracking user selections to build a selection history; and
   partitioning the set of content items between the first subset and the second subset based on the selection history.

8. The method of claim 1, wherein displaying the first subset of content items and the search element further involves:
  performing a query to determine the set of content items;
  forming the first subset of content items based on preliminary results from the query; and
  displaying the first subset of content items and the search element before the completion of the query.

9. A computer-readable storage medium storing instructions that when executed by a computer cause the computer to perform a method for displaying and browsing through a sparse view of content items in a hierarchy, the method comprising:
  receiving a request to display a set of content items with a common parent in the hierarchy, wherein a display area on a computer display has insufficient space to simultaneously display all of the content items from the set of content items, and wherein the set of content items includes a first subset of content items and a disjoint second subset of content items;
  displaying the first subset of content items;
  displaying as a content item in the hierarchy a search element that represents the second subset of content items, wherein displaying the search element indicates to a user the presence of the second subset of content items which are not currently displayed;
  upon receiving a selection of the search element by a user, initiating a search operation that allows the user to determine and select a desired content item from the second subset of content items;
  upon receiving a user-selected content item from the second subset of content items during the search operation, adjusting the first subset of content items to include the user-selected content item; and
  displaying the adjusted first subset of content items in the computer display.

10. The computer-readable storage medium of claim 9,
  wherein when a content item is selected from the second subset of content items, the content item is dynamically moved from the second subset to the first subset; and
  wherein dynamically moving the content item from the second subset to the first subset causes the display of the content item.

11. The computer-readable storage medium of claim 9, wherein displaying the search element involves displaying the size of the second subset of content items.

12. The computer-readable storage medium of claim 9, wherein receiving the request to display the set of content items further involves:
  receiving a first limit on the number of content items which can be displayed; and
  wherein if the number of content items is less than the first limit, all content items in the set of content items are displayed, and no search element is displayed.

13. The computer-readable storage medium of claim 12, where receiving the request to display the set of content items further involves:
  receiving a second limit on the number of content items which can be displayed; and
  wherein if the number of content items is greater than the first limit, the size of the first subset of content items is limited to the second limit, and the first subset of content items and the search element are displayed.

14. The computer-readable storage medium of claim 10, wherein the search operation involves opening a search window in which the user can perform a parameterized search that generates a set of results; and
  wherein selecting a result from the set of results causes the selection of a corresponding content item in the set of content items.

15. The computer-readable storage medium of claim 9, wherein the method further comprises:
  tracking user selections to build a selection history; and
  partitioning the set of content items between the first subset and the second subset based on the selection history.

16. The computer-readable storage medium of claim 9, wherein displaying the first subset of content items and the search element further involves:
  performing a query to determine the set of content items;
  forming the first subset of content items based on preliminary results from the query; and
  displaying the first subset of content items and the search element before the completion of the query.

17. An apparatus for displaying and browsing through a sparse view of content items in a hierarchy, comprising:
  a receiving mechanism configured to receive a request to display a set of content items with a common parent in the hierarchy, wherein a display area on a computer display has insufficient space to simultaneously display all of the content items from the set of content items, and wherein the set of content items includes a first subset of content items and a disjoint second subset of content items;
  a display mechanism configured to display the first subset of content items;
  a display mechanism further configured to display as a content item in the hierarchy a search element that represents the second subset of content items, wherein displaying the search element indicates to a user the presence of the second subset of content items which are not currently displayed;
  a search mechanism configured to, upon receiving a selection of the search element by a user, initiate a search operation that allows the user to determine and select a desired content item from the second subset of content items; and
  wherein the search mechanism is further configured to, upon receiving a user-selected content item from the second subset of content items during the search operation, adjust the first subset of content items to include the user-selected content item and display the adjusted first subset of content items in the computer display.

18. The apparatus of claim 17,
  wherein when a content item is selected from the second subset of content items, the content item is dynamically moved from the second subset to the first subset; and
  wherein dynamically moving the content item from the second subset to the first subset causes the display of the content item.

19. The apparatus of claim 17, wherein displaying the search element involves displaying the size of the second subset of content items.

20. The apparatus of claim 18,
  wherein the search operation includes opening a search window in which the user can perform a parameterized search that generates a set of results; and
    wherein selecting a result from the set of results causes the selection of a corresponding content item in the set of content items.

* * * * *